(12) United States Patent
Michioka et al.

(10) Patent No.: US 7,798,719 B2
(45) Date of Patent: Sep. 21, 2010

(54) METHOD OF MANUFACTURING LINEAR GUIDE DEVICE AND TRACK RAIL FOR THE LINEAR GUIDE DEVICE

(75) Inventors: Hidekazu Michioka, Tokyo (JP); Tomoyuki Aida, Tokyo (JP); Katsuya Iida, Tokyo (JP)

(73) Assignee: THK Co., Ltd., Tokyo (JP)

( * ) Notice: Subject to any disclaimer, the term of this patent is extended or adjusted under 35 U.S.C. 154(b) by 563 days.

(21) Appl. No.: 11/661,693

(22) PCT Filed: Sep. 7, 2005

(86) PCT No.: PCT/JP2005/016436
§ 371 (c)(1), (2), (4) Date: Jan. 7, 2008

(87) PCT Pub. No.: WO2006/028142
PCT Pub. Date: Mar. 16, 2006

(65) Prior Publication Data
US 2008/0253703 A1 Oct. 16, 2008

(30) Foreign Application Priority Data
Sep. 8, 2004 (JP) .............................. 2004-260487

(51) Int. Cl.
*F16C 29/04* (2006.01)
*B21K 1/05* (2006.01)
(52) U.S. Cl. .............................. 384/49; 384/45; 384/51; 29/898.03
(58) Field of Classification Search .................. 384/15, 384/43–45, 49, 51, 55, 59; 29/898.03, 898.066
See application file for complete search history.

(56) References Cited

U.S. PATENT DOCUMENTS

| 4,025,995 A | * | 5/1977 | Thomson .................. 29/898.03 |
| 5,067,823 A | | 11/1991 | Kasuga |
| 5,195,391 A | * | 3/1993 | Barbat et al. .................. 384/45 |

(Continued)

FOREIGN PATENT DOCUMENTS

DE          1940784 U      6/1966

(Continued)

OTHER PUBLICATIONS

International Search Report of PCT/JP2005/016436, date of mailing, Dec. 27, 2005.

(Continued)

*Primary Examiner*—Marcus Charles
(74) *Attorney, Agent, or Firm*—Westerman, Hattori, Daniels & Adrian, LLP

(57) ABSTRACT

A track rail is composed of a pair of rail members in which rolling contact surfaces for rolling bodies are formed, respectively, and a rail housing equipped with a pair of rail mounting grooves in which those rail members are fitted, respectively. Each of the rail members is fixed within a corresponding one of the rail mounting grooves via an adhesive layer. A reference projection, formed on a bottom of one of the pair of the rail mounting grooves, is in contact with a corresponding one of the rail members without the intermediary of the adhesive layer. The rail member fitted in the one of the rail mounting grooves is adhesively fixed in a state of being abutted against the reference projection. The rail member fitted in the other rail mounting groove is adhesively fixed at a predetermined distance from the reference projection.

5 Claims, 8 Drawing Sheets

U.S. PATENT DOCUMENTS

| | | | |
|---|---|---|---|
| 5,217,308 A * | 6/1993 | Schroeder | 384/45 |
| 5,431,498 A * | 7/1995 | Lyon | 384/45 |
| 5,640,768 A * | 6/1997 | Teramachi | 29/898.03 |
| 5,800,065 A * | 9/1998 | Lyon | 384/45 |
| 5,930,898 A * | 8/1999 | Lyon | 29/898.03 |
| 2002/0144561 A1 | 10/2002 | Nagai et al. | |
| 2004/0083933 A1 | 5/2004 | Baric et al. | |

FOREIGN PATENT DOCUMENTS

| | | |
|---|---|---|
| DE | 3504061 A1 | 8/1986 |
| JP | 02-113114 A | 4/1990 |
| JP | 2-113114 A | 4/1990 |
| JP | 2-309011 A | 12/1990 |
| JP | 02-309011 A | 12/1990 |
| JP | 8-4764 A | 1/1996 |
| JP | 08-004764 A | 1/1996 |
| JP | 08-014254 A | 1/1996 |
| JP | 8-14254 A | 1/1996 |
| JP | 2002-303320 A | 10/2002 |

OTHER PUBLICATIONS

European Search Report dated Dec. 29, 2008, issued in corresponding European Patent Application No. 05782259.5.

* cited by examiner (a)

(b)

(a)

(b)

METHOD OF MANUFACTURING LINEAR GUIDE DEVICE AND TRACK RAIL FOR THE LINEAR GUIDE DEVICE

TECHNICAL FIELD

The present invention relates to a linear guide device having a structure in which a track rail and a mobile block are combined with each other via a multitude of balls so that a mounted object fixed to the mobile block can be freely reciprocated along the track rail, and more particularly, to a linear guide device and a method of manufacturing a track rail of the linear guide device which make it possible to form the track rail at low cost and with accuracy.

BACKGROUND ART

In linear guide portions of work tables of machine tools and various carrier devices, rolling guide devices each having a structure in which a mobile block mounted with a movable body such as a table continuously moves along a track rail are very often used. In this type of rolling guide device, the mobile block is combined with the track rail via a multitude of rolling bodies such as balls or rollers, and each of the rolling bodies runs in a rolling manner while applying a load between the mobile block and the track rail, so a mounted object fixed to the mobile block is allowed to make light movements along the track rail with negligible resistance.

The track rail has a rolling contact surface for regulating the rolling direction of the rolling bodies, and the rolling contact surface is required to exhibit sufficient hardness. In this type of linear guide device, therefore, the track rail itself is generally formed of a quenchable metal material or a carburized steel. The entire track rail or only a region thereof where the rolling contact surface is formed is then subjected to heat treatment such as quenching, so the hardness of the rolling contact surface is enhanced.

However, when being subjected to the heat treatment, the track rail undergoes deformations such as bending and torsion, so there is an inconvenience in that an operation of correcting such deformations becomes inevitable. Although an attempt to automate the operation of correcting the deformations of the track rail has also been made, subtle bending or subtle torsion cannot be eliminated completely. In order to achieve movements of the mobile block with high accuracy, a skilled operator needs to perform a corrective operation. This leads to a decline in the production efficiency and a rise in production cost in producing the linear guide device.

On the other hand, a linear guide device disclosed in each of JP 02-309011 A, JP 08-14254 A, JP 2002-303320 A, and the like is known as a solution to the problem described above. In the linear guide device disclosed in each of those documents, a track rail is composed of rail members equipped with rolling contact surfaces for balls and a rail housing equipped with mounting grooves for the rail members, and the rail members are fixed to the mounting grooves of the rail housing respectively using a method such as press-fitting, adhesion, or brazing. The rolling contact surfaces for the balls are formed in the rail members, respectively. Therefore, if a material exhibiting sufficient hardness is selected for the rail members, there is no need to subject the rail housing itself to heat treatment such as quenching or to perform the corrective operation following the heat treatment as described above. Further, an extruded material of aluminum alloy, a concrete molded product, or the like can also be used for the rail housing, so there is also an advantage in that the most suitable and inexpensive material corresponding to the intended purpose of the linear guide device can be selected for the rail housing.

Patent Document 1: JP 02-309011 A
Patent Document 2: JP 08-14254 A
Patent Document 3: JP 2002-303320 A

DISCLOSURE OF THE INVENTION

Problems to be Solved by the Invention

In a linear guide device, incidentally, a mobile block applies loads acting on a mounted object in all directions, so it is impossible to provide a track rail with only one streak of a rolling contact surface for rolling bodies. In many cases, a plurality of streaks of rolling contact surfaces are formed in the track rail. Those rolling contact surfaces are formed in a pair of surfaces of the track rail facing each other, a pair of surfaces of the track rail oriented away from each other, or the like. In most cases, the plurality of the streaks of the rolling contact surfaces are formed in the track rail at discrete positions thereof. Therefore, as described above, if rolling contact surfaces for rolling bodies is formed in rail members and the rail members are fixed to a rail housing, there is a need to provide the rail members so as to correspond to the respective rolling contact surfaces and to fix the plurality of the rail members to the rail housing.

However, when the plurality of the rail members are individually fixed to the rail housing as described above, there are problems in that parallelism between the rail members cannot be ensured with accuracy and in that the moving accuracy of the mobile block cannot be enhanced. Thus, in each of the linear guide devices disclosed in JP 08-14254 A and JP 2002-303320 A, after all the rail members are fixed to the rail housing, the ball rolling contact surfaces of the respective rail members are ground for finish, so parallelism between the ball rolling contact surfaces provided for the respective rail members is ensured.

That is, the rail members in which the rolling contact surfaces for the rolling bodies are formed are fixed to the rail housing, so the operation of correcting deformations of the track rail after the heat treatment becomes unnecessary. However, the rail members require finishing after being fixed to the rail housing. As a result, no dramatic improvement in production efficiency or no dramatic reduction in production cost has been achieved in producing the track rail.

Further, the rolling contact surfaces for the rolling bodies require grinding for finish after the rail members are fixed to the rail housing. Therefore, the process of fixing the rail members to the rail housing cannot be carried out on a field where each of the linear guide devices is actually used. Thus, there is also a problem in that the selectivity of various materials for the rail housing as described above cannot be taken full advantage of.

Means for Solving the Problems

The present invention has been made to solve the above-mentioned problems, and it is therefore an object of the present invention to provide a linear guide device and a method of manufacturing a track rail of the linear guide device which make it unnecessary to finish rolling contact surfaces for rolling bodies for the purpose of ensuring parallelism between the rolling contact surfaces after fixing a plurality of rail members, in which the rolling contact surfaces for the rolling bodies are formed, to a rail housing while making it possible to achieve a maximum possible improvement in production efficiency and a reduction in production cost in producing the track rail.

It is another object of the present invention to provide a linear guide device and a method of manufacturing a track rail of the linear guide device which make it possible to assemble the track rail on an actual field of use thereof and flexibly select a material to be used for the track rail according to the intended purpose thereof while enhancing the moving accuracy of a mobile block.

In a linear guide device according to the present invention, which achieves the above-mentioned objects, a track rail is composed of a pair of rail members in which rolling contact surfaces for rolling bodies are formed, respectively, and a rail housing equipped with a pair of rail mounting grooves in which those rail members are fitted, respectively. Each of the rail members is fixed within a corresponding one of the rail mounting grooves via an adhesive layer. The regions of the rail housing in which the rail mounting grooves are differently formed depending on the shape of the track rail. For example, the rail mounting grooves are formed in inner surfaces of a track rail formed in the shape of a channel, which face each other, or lateral surfaces of a track rail formed in the shape of a rectangle, respectively.

A reference projection is formed on a bottom of one of the pair of the rail mounting grooves formed in the rail housing. The reference projection is in contact with a corresponding one of the rail members without the intermediary of the adhesive layer. The rail member fitted in the one of the rail mounting grooves is adhesively fixed in a state of being abutted against the reference projection. The rail member fitted in the other rail mounting groove is adhesively fixed at a predetermined distance from the reference projection. That is, in the present invention, the rail mounting groove on which the reference projection is formed can be referred to as reference rail mounting groove, and the other rail mounting groove can be referred to as driven rail mounting groove.

According to the present invention described above, the rail member fitted in the driven rail mounting groove is fixed to the rail housing without reference to the driven rail mounting groove but with reference to the reference projection provided on the other groove, namely, the reference rail mounting groove. Therefore, immediately after the pair of the rail members are fixed to the rail housing, parallelism between the rolling contact surfaces for the rolling bodies, which are provided for the rail members, is ensured. Accordingly, the rolling contact surfaces for the rolling bodies do not require grinding for finish after the rail members are fixed. As a result, a simplification of the production process of the track rail and a reduction in the production cost thereof can be achieved.

A method of manufacturing a track rail described above includes the following steps. That is, the method includes the steps of: forming a rail housing having a pair of rail mounting grooves and forming a reference projection on a bottom of one of the rail mounting grooves; applying adhesive into the rail mounting grooves, respectively; fitting a rail member in which a rolling contact surface for rolling bodies is formed into a reference rail mounting groove, namely, the rail mounting groove on which the reference projection is formed and abutting a back surface of the rail member against the reference projection; fitting another rail member in which a rolling contact surface for rolling bodies is formed into a driven rail mounting groove, namely, the other rail mounting groove and then gradually thrusting a rail reference jig for engaging both the rail members as a pair from ends of those rail members in a longitudinal direction thereof to position the rail member within the driven rail mounting groove; and extracting the rail reference jig from between the pair of the rail members after curing of the adhesive.

When the track rail is manufactured according to the method described above, the rail member fitted in the reference rail mounting groove is referred to in positioning the rail member fitted in the other rail mounting groove. Therefore, even if the rolling contact surfaces for the rolling bodies are not ground for finish after the rail members are fixed to the rail housing, parallelism between the rolling contact surfaces formed in the pair of the rail members can be ensured. As a result, the track rail can be manufactured with ease and at low cost.

The rolling contact surfaces do not require finishing after the rail members are fixed to the rail housing. Therefore, if the rail members having the already finished rolling contact surfaces for the rolling bodies are fitted in the mounting grooves of the rail housing, respectively, the rail housing can also be manufactured at a spot where the linear guide device is actually used. For example, an extremely large rail housing can also be formed using concrete or wood. Thus, the intended purpose of the linear guide device can be widened.

BRIEF DESCRIPTION OF THE DRAWINGS

FIG. 9(a) as a part of FIG. 9 shows a state in which the rail reference jig has not been inserted into a gap between the pair of the rail members, and FIG. 9(b) as the other part of FIG. 9 shows a state in which the rail reference jig has been inserted into the gap between the pair of the rail members.

FIG. 10(a) as a part of FIG. 10 shows a state in which the rail member has not been fitted, and FIG. 10(b) as the other part of FIG. 10 shows a state in which the rail member has been fitted.

BEST MODE FOR CARRYING OUT THE INVENTION

A linear guide device according to the present invention will be described hereinafter in detail with reference to the accompanying drawings.

Figure 1:
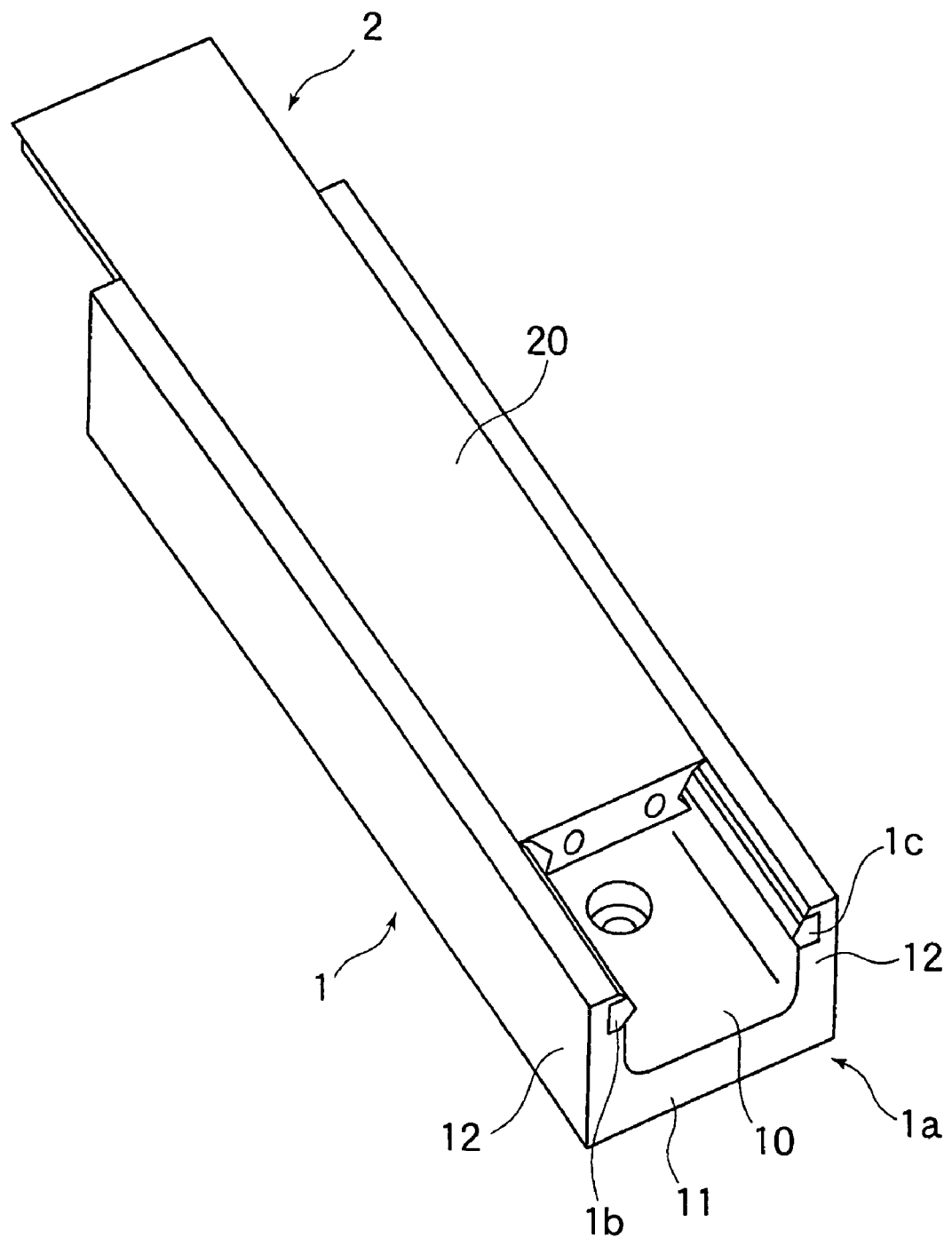
FIG. 1 is a perspective view showing Embodiment 1 of a linear guide device to which the present invention is applied.
Figure 2:
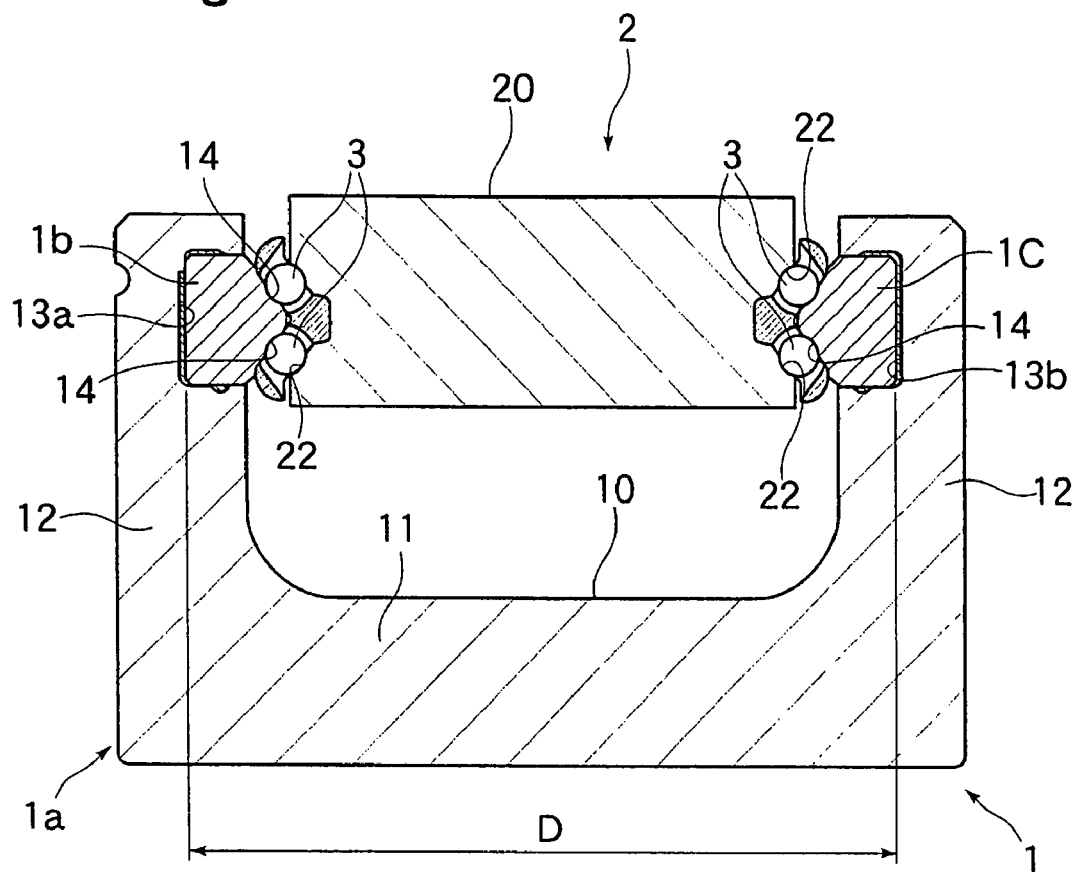
FIG. 2 is a front sectional view of the linear guide device shown in FIG. 1.

FIGS. 1 and 2 each show Embodiment 1 of the linear guide device to which the present invention is applied. This linear guide device is composed of a track rail 1 formed in the shape of a channel and having a guide groove 10 extending continuously in a longitudinal direction thereof, and a mobile block 2 fitted within the guide groove 10 of the track rail 1 via a multitude of balls 3. The linear guide device is constructed such that the mobile block 2 reciprocates freely within the guide groove 10 of the track rail 1.

The mobile block 2, which is formed in the shape of a rectangle, is fitted within the guide groove 10 of the track rail 1 via the balls 3 as shown in FIG. 2. The mobile block 2 protrudes slightly above the guide groove 10 of the track rail 1, and a top surface of the mobile block 2 serves as a mounting surface 20 for a mounted object such as a table. In addition, two streaks of ball rolling contact surfaces 22 are formed vertically adjacent to each other in each of lateral surfaces of the mobile block 2.

On the other hand, the track rail 1 is composed of a rail housing 1a formed in the shape of a channel, and a pair of rail members 1b and 1c fixed to the rail housing 1a. The rail housing 1a is equipped with a base portion 11 fixed to a mounted portion of each of various machines, and a pair of lateral wall portions 12 and 12 provided upright on both sides of the base portion 11, respectively. The guide groove 10, which serves as a passage for the mobile block 2, is defined between the lateral wall portions 12 and 12 facing each other. Rail mounting grooves 13a and 13b, which are notches having a rectangular cross-sectional shape, are formed in the lateral walls 12 and 12 at such positions as to face the lateral surfaces of the mobile block 2, respectively. The rail members 1b and 1c are fitted in the rail mounting grooves 13a and 13b, respectively.

The rail members 1b and 1c, which are formed in substantially the same shape as the rail mounting grooves 13a and 13b formed in the rail housing 1a, are adhesively fixed within the rail mounting grooves 13a and 13b, respectively. Thus, narrow clearances for interposing adhesive layers are formed between the rail members 1b and 1c and the rail mounting groove 13a and 13b, respectively. Ball rolling contact surfaces 14, which face the ball rolling contact surfaces 22 of the mobile block 2, respectively, are formed in lateral surfaces of the rail members 1b and 1c, respectively. The balls 3 are arranged between the mobile block 2 and the rail members 1b and 1c respectively in a state of being in contact with both the ball rolling contact surfaces 22 of the mobile block 2 and the ball rolling contact surfaces 14 of the rail members 1b and 1c, respectively.

Figure 3:
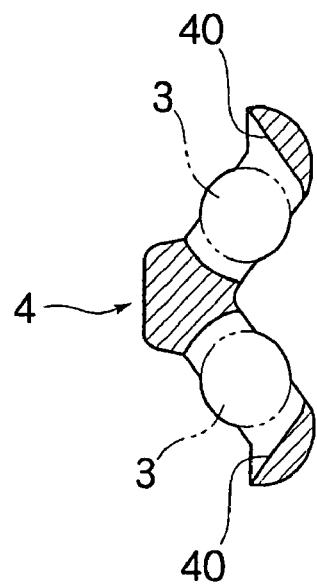
FIG. 3 is a front sectional view showing a ball cage in the linear guide device shown in FIG. 1.

A ball cage 4 made of a synthetic resin is interposed between the mobile block 2 and each of the rail members 1b and 1c. Retention holes for accommodating the individual balls 3 are arranged in the ball cage 4 in two rows along a moving direction of the mobile block 2. As shown in FIG. 3, each of the balls 3 can freely rotate in a state of being accommodated in a corresponding one of the retention holes 40 of the ball cage 4. Inner peripheral surfaces of the retention holes 40 are formed so as to correspond in shape to spherical surfaces of the balls 3, respectively, so there is obtained a structure in which a membrane of a lubricant such as grease is easily retained between the inner peripheral surface of each of the retention holes 40 and the spherical surface of a corresponding one of the balls 3. The ball cage 4 moves between the mobile block 2 and each of the rail members 1b and 1c as the balls 3 roll. When the mobile block 2 reciprocates covering a certain distance, the ball cage 4 reciprocates covering half of the distance.

Figure 4:
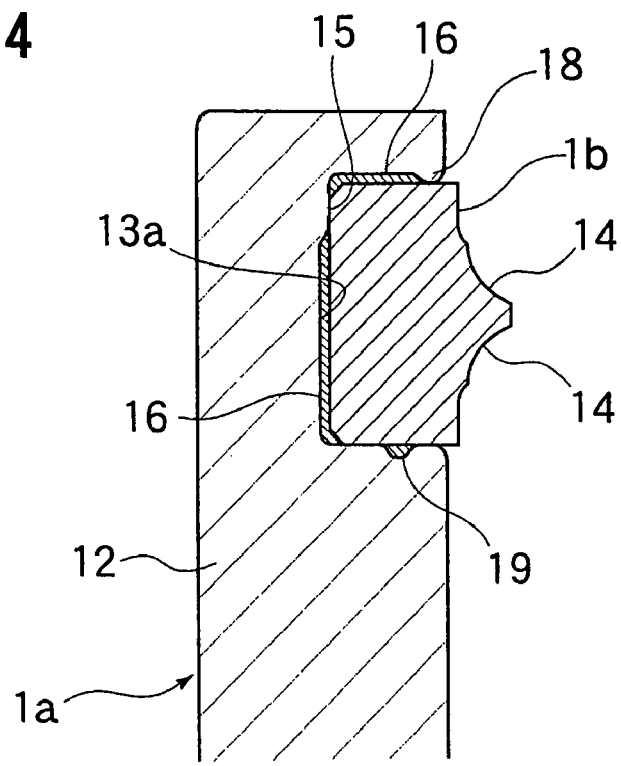
FIG. 4 is an enlarged sectional view showing a reference rail mounting groove of a rail housing in detail.
Figure 5:
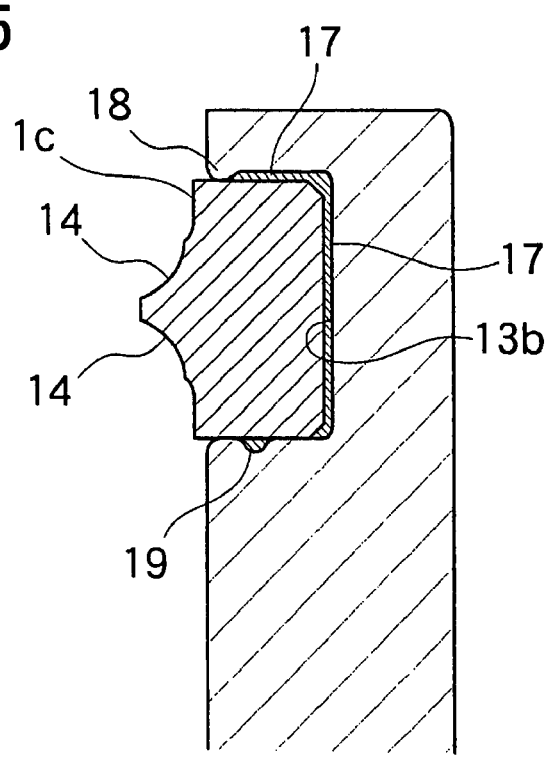
FIG. 5 is an enlarged sectional view showing a driven rail mounting groove of the rail housing in detail.

FIGS. 4 and 5 are enlarged views showing states in which the rail members 1b and 1c are mounted in the rail mounting grooves 13a and 13b of the rail housing 1a, respectively. Those rail mounting grooves 13a and 13b are formed at such positions as to face each other via the mobile block 2. The rail mounting groove 13a shown in FIG. 4 forms a mounting reference for the rail member 1c fitted in the rail mounting groove 13b as well as the rail member 1b fitted in the rail mounting groove 13a. A reference projection 15 against which a back surface of the rail member 1b is abutted is formed on a bottom of the rail mounting groove serving as the reference (hereinafter referred to as "the reference rail mounting groove") 13a. When the rail member 1b is engaged with the reference projection 15, the fitting position of the rail member 1b in a depth direction of the reference rail mounting groove 13a (in lateral direction on sheet of FIGS. 4 and 5) is thereby determined. Adhesive layers 16 made of an adhesive are formed on a top surface and the back surface of the rail member 1b, respectively. A bottom surface of the rail member 1b is in direct contact with the rail housing 1a without the intermediary of an adhesive layer. Thus, the rail member 1b is positioned in a width direction of the reference rail mounting groove 13a (in vertical direction on sheet of FIGS. 4 and 5) and the depth direction thereof, respectively.

On the other hand, as shown in FIG. 5, the reference projection 15 as described above is not formed on the rail mounting groove 13b facing the reference rail mounting groove 13a (hereinafter referred to as "the driven rail mounting groove"). An adhesive layer 17 is formed on an entire back surface of the rail member 1c fitted in the driven rail mounting groove 13b. The rail member 1c is positioned in a depth direction of the driven rail mounting groove 13b (in lateral direction on sheet of FIGS. 4 and 5) with reference to the reference projection 15 formed on the bottom of the reference rail mounting groove 13a facing the driven rail mounting groove 13b. That is, as shown in FIG. 2, the rail member 1c is positioned within the driven rail mounting groove 13b such that a distance D between the rail member 1c fitted in the driven rail mounting groove 13b and the reference projection 15 becomes equal to a predetermined value. Thus, the thickness of the adhesive layer 17 present between the back surface of the rail member 1c and the bottom of the driven rail mounting groove 13b slightly differs depending on the machining accuracy of the rail housing 1a. The adhesive layer 17, which is made of the adhesive, is formed on a top surface and the back surface of the rail member 1c. A bottom surface of the rail member 1c is in direct contact with the rail housing 1a without the intermediary of an adhesive layer. Thus, the rail member 1c is positioned in a width direction of the driven rail mounting groove 13b (in vertical direction on sheet of FIGS. 4 and 5) and the depth direction thereof, respectively.

In order to prevent the adhesive from leaking out from opening edges of the rail mounting grooves 13a and 13b when the rail members 1b and 1c are thrust into the rail mounting grooves 13a and 13b, respectively, while sealing protrusions 18 abut on the top surfaces of the rail members 1b and 1c, respectively, sealing grooves 19 are formed respectively in those lateral surfaces of the rail mounting grooves 13a and 13b with which the bottom surfaces of the rail members 1b and 1c are in contact, respectively.

Next, a method of manufacturing a track rail as described above will be described.

First of all, the rail housing 1a and the rail members 1b and 1c are formed separately. The rail housing 1a may be formed of a material such as concrete and wood instead of a metal material as long as the reference projection 15 can be formed within the reference rail mounting groove 13a with accuracy.

For example, it is conceivable to form the rail housing 1*a* through extrusion of an aluminum alloy. The reference projection 15 serves as a reference of parallelism in fixing the rail members 1*b* and 1*c* to the rail housing 1*a* and therefore needs to be formed straight.

The rail members 1*b* and 1*c* are preferably made of a metal material, which can be subjected to heat treatment such as quenching, because the hardness of the ball rolling contact surfaces 14 needs to be enhanced. For example, steel materials are drawn into the cross-sectional shape of the rail members 1*b* and 1*c* and then ground to form the ball rolling contact surfaces 14. The ball rolling contact surfaces 14 of the rail members 1*b* and 1*c* are not finished after the rail members 1*b* and 1*c* are fixed to the rail housing 1*a*. Therefore, the ball rolling contact surfaces 14 require grinding at this stage so as to extend parallel to the back surfaces of the respective rail members 1*b* and 1*c* with reference thereto.

Figure 6:
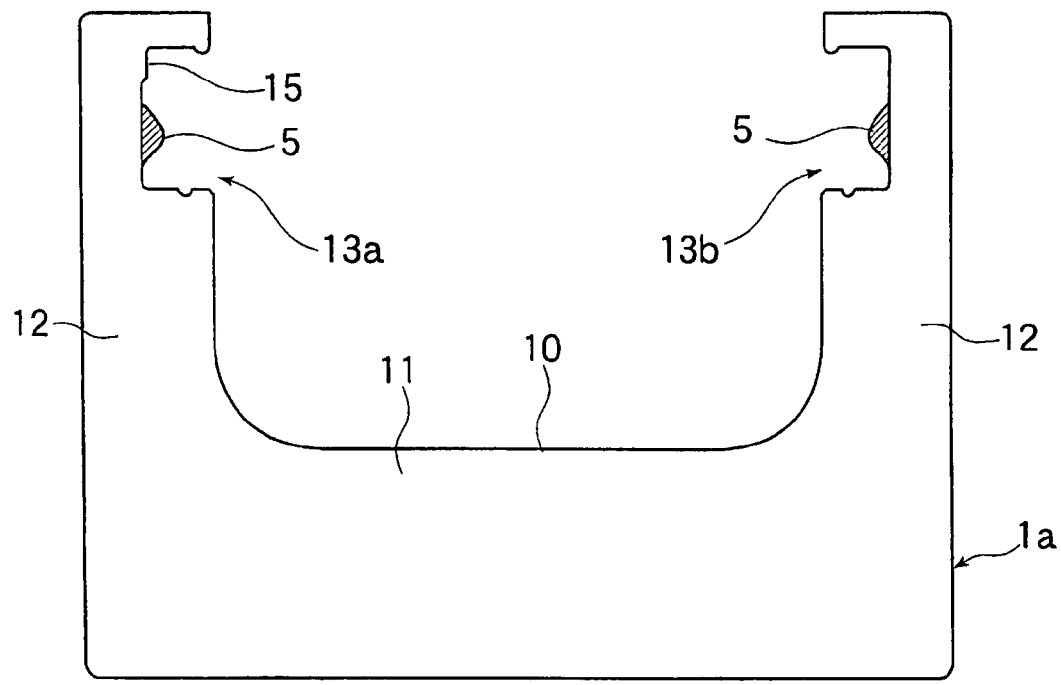
FIG. 6 is a view showing a step of applying adhesive into the rail mounting grooves in a method of manufacturing a track rail according to the present invention.
Figure 7:
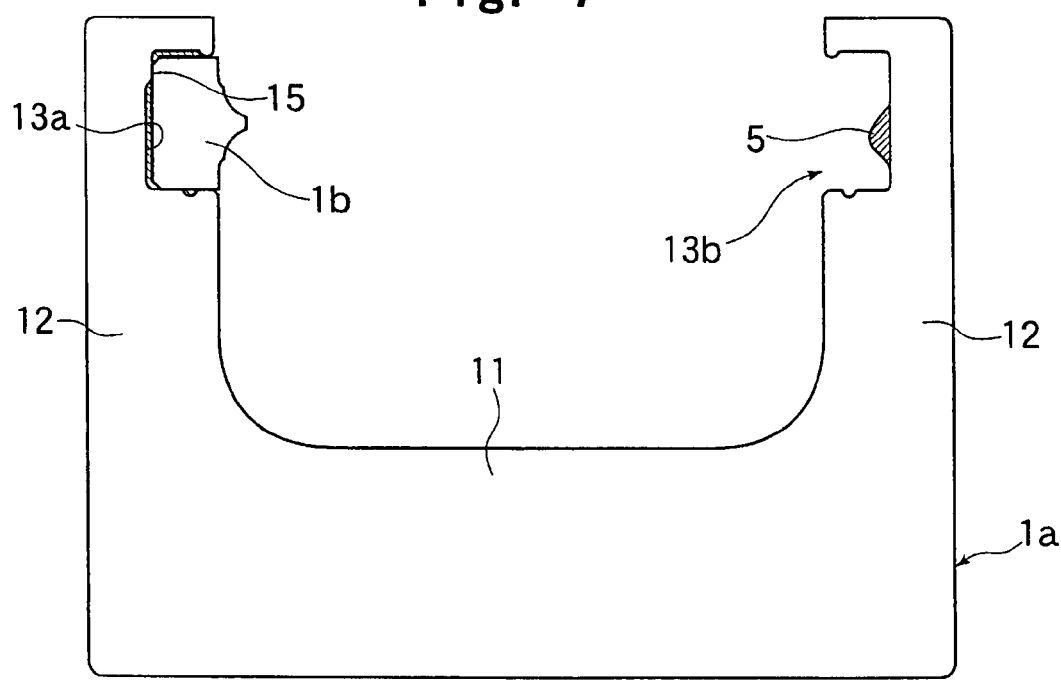
FIG. 7 is a view showing a step of fitting a rail member into the reference rail mounting groove in the method of manufacturing a track rail according to the present invention.

After the rail housing 1*a* and the rail members 1*b* and 1*c* are machined, the rail members 1*b* and 1*c* are fitted into the rail mounting grooves 13*a* and 13*b* of the rail housing 1*a* respectively and adhesively fixed thereto. First of all, as shown in FIG. 6, the adhesive 5 are piled on surfaces of the rail mounting grooves 13*a* and 13*b* on which the adhesive layers 16 and 17 are to be formed, respectively. In the reference rail mounting groove 13*a*, in this case, the adhesive 5 needs to be kept from covering the reference projection 15. Subsequently, as shown in FIG. 7, the rail member 1*b* is fitted into the reference rail mounting groove 13*a* and thrust thereinto until the back surface of the rail member 1*b* is engaged with the reference projection 15. Thus, the rail member 1*b* is positioned with respect to the reference rail mounting groove 13*a*. In this case, the adhesive 5 piled in the rail mounting groove 13*a* is compressed and spread by the rail member 1*b*, thereby forming the adhesive layer 16 whose thickness corresponds to the height of the reference projection 15.

Figure 8:
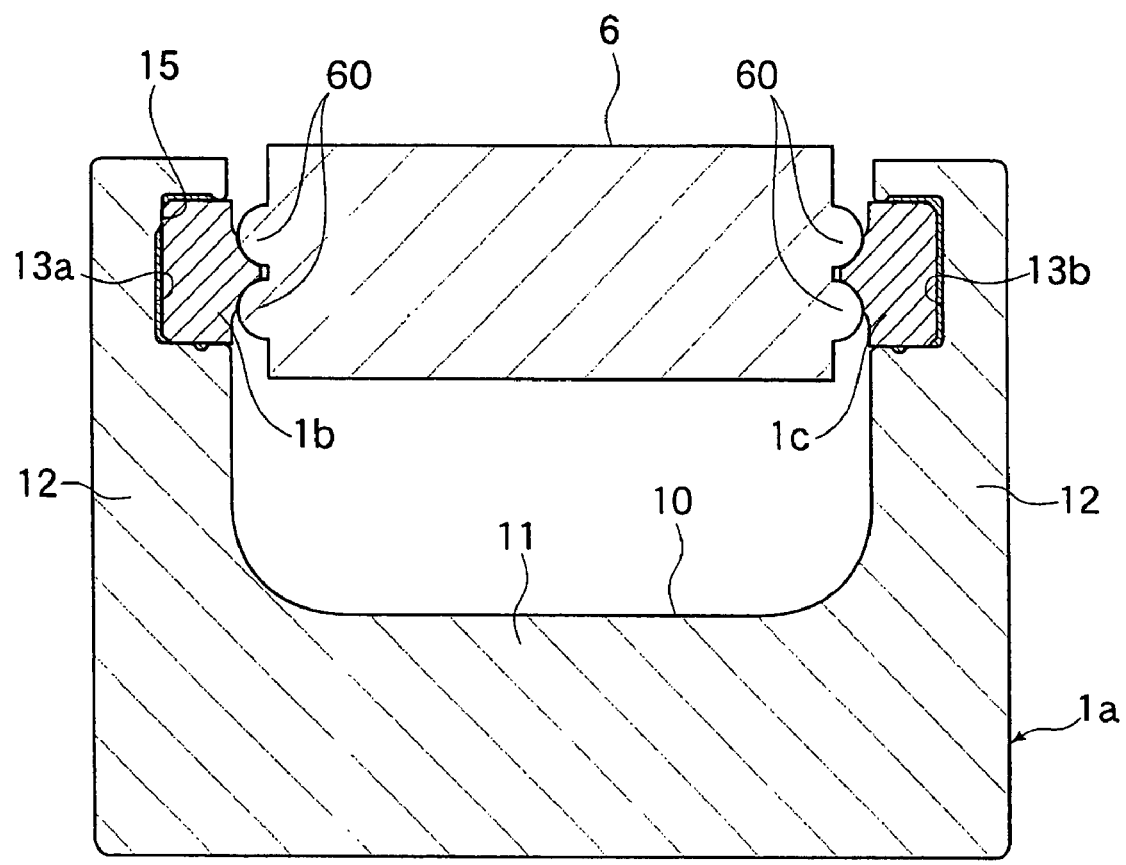
FIG. 8 is a view showing a step of fitting another rail member into the driven rail mounting groove in the method of manufacturing a track rail according to the present invention.

After the rail member 1*b* is fixed to the rail housing 1*a*, the rail member 1*c* is then fitted into the driven rail mounting groove 13*b* and thrust thereinto using a rail reference jig 6 as shown in FIG. 8. The rail reference jig 6 is constructed as a masterpiece for equalizing the clearance between the pair of the rail members 1*b* and 1*c* with a predetermined value. A total of four streaks of ball projection portions 60, which come into contact with the ball rolling contact surfaces 14 of the rail members 1*b* and 1*c*, respectively, are formed two by two on lateral surfaces of the rail reference jig 6, respectively.

Figure 9:
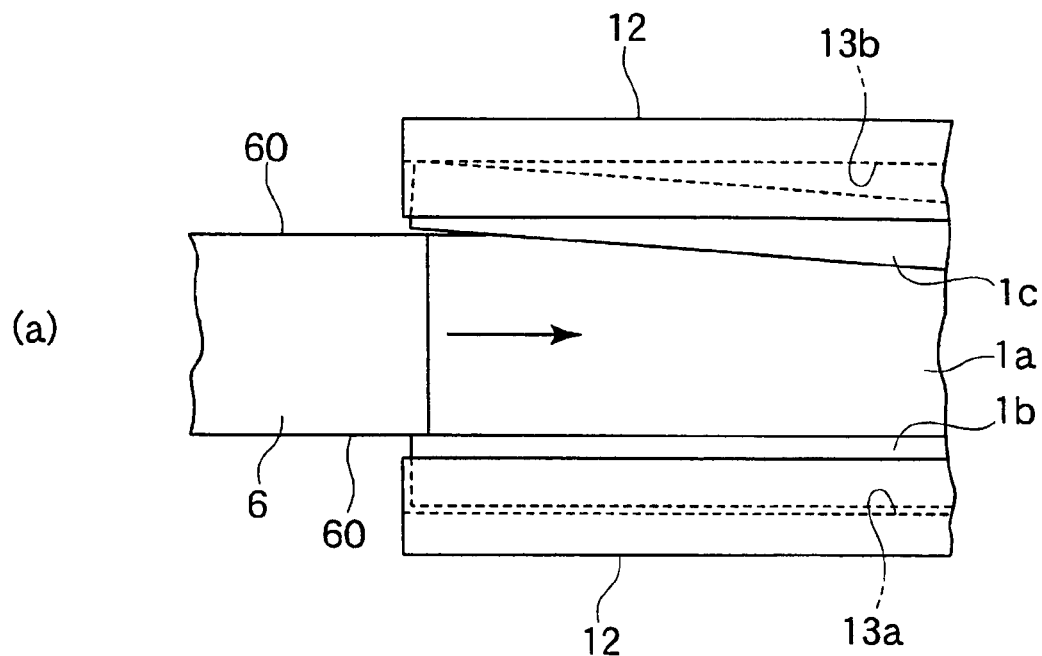
FIG. 9 is a view for explaining how to use a rail reference jig.
Figure 9:
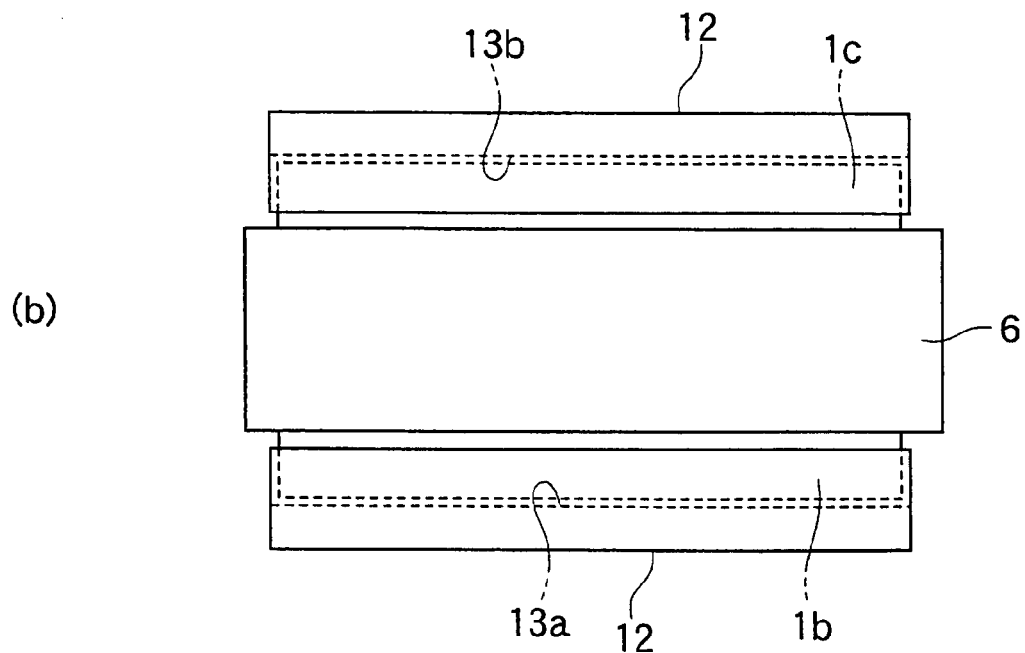

FIG. 9 is a plan view showing how the rail member 1*c* is positioned using the rail reference jig 6. First of all, the rail member 1*c* is lightly fitted into the driven rail mounting groove 13*b*, and the rail reference jig 6 is then pressed forward into a gap between the rail members 1*b* and 1*c* from an end of the rail housing 1*a*. Before the rail reference jig 6 is pressed forward into the gap between the pair of the rail members 1*b* and 1*c*, the rail member 1*c* is not positioned at all as shown in FIG. 9(*a*) as a part of FIG. 9, so parallelism between the rail members 1*b* and 1*c* is uncertain. However, as the rail reference jig 6 is pressed forward, the rail member 1*c* is thrust into the driven rail mounting groove 13*b*, so the rail member 1*c* is positioned while the ball rolling contact surfaces 14 of the rail members 1*b* and 1*c* are in tight contact with the ball projection portions 60 of the rail reference jig 6, respectively. In this case, the adhesive 5 piled in the driven rail mounting groove 13*b* is compressed and spread by the rail member 1*c*, thereby forming the adhesive layer 17 whose thickness corresponds to the amount by which the rail member 1*c* is thrust into the driven rail mounting groove 13*b*. Accordingly, as shown in FIG. 9(*b*) as the other part of FIG. 9, in a case where the rail reference jig 6 has completely entered the gap between the pair of the rail members 1*b* and 1*c*, the rail member 1*c* is positioned within the driven rail mounting groove 13*b* with reference to a fixed position of the rail member 1*b*. In other words, the rail member 1*c* is positioned at a predetermined distance from the reference projection 15 in the reference rail mounting groove 13*a*.

In the case where the rail member 1*c* has been positioned as described above, the rail reference jig 6 is extracted from between the pair of the rail members 1*b* and 1*c* after the adhesive layers 16 and 17 completely cured. Thus, the entire process of manufacturing the track rail 1 is terminated.

According to the method of manufacturing a track rail 1 as described above, after one of the rail members 1*b* is positioned and fixed with respect to the reference projection 15 of the rail housing 1*a*, the other rail member 1*c* is positioned and fixed with reference to the rail member 1*b*. As a result, parallelism between both the rail members 1*b* and 1*c* can be ensured. In positioning and fixing the latter rail member 1*c*, the thickness of the adhesive layer 17 is changed in accordance with the positioning of the rail member 1*c*, so the rail member 1*c* can be fixed at a suitable position regardless of the machining accuracy of the driven rail mounting groove 13*b* formed in the rail housing 1*a*.

Accordingly, when the track rail 1 is manufactured according to the method of the present invention, parallelism between the pair of the rail members 1*b* and 1*c* can be ensured merely through the fitting of the rail members 1*b* and 1*c* into the rail mounting grooves 13*a* and 13*b* of the rail housing 1*a*. Also, the ball rolling contact surfaces 14 do not require grinding for finish after the rail members 1*b* and 1*c* are fixed, so the track rail 1 can be manufactured with corresponding ease and at correspondingly low cost.

Grinding for finish is not required after the rail members 1*b* and 1*c* are fixed. Therefore, it is also possible to form the rail housing 1*a* at a spot where the linear guide device is used, and fix the rail members 1*b* and 1*c* to the rail housing 1*a* at the spot. It is also possible to use concrete or wood as a material for forming the rail housing 1*a*. In addition, it is also possible to widen the intended purpose of the linear guide device to various purposes for which the use of the linear guide device has been difficult until now.

Figure 10:
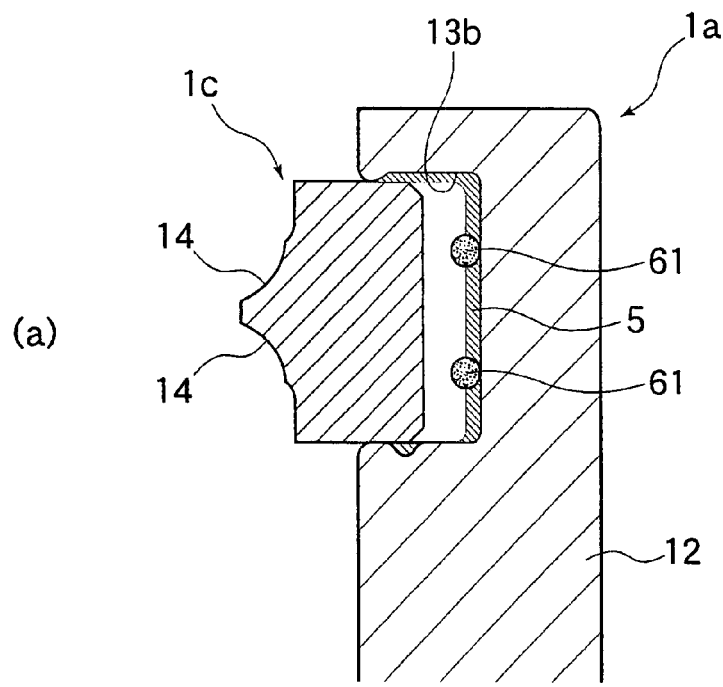
FIG. 10 shows an example in which an elastic member is interposed in fitting the rail member into the driven rail mounting groove.
Figure 10:
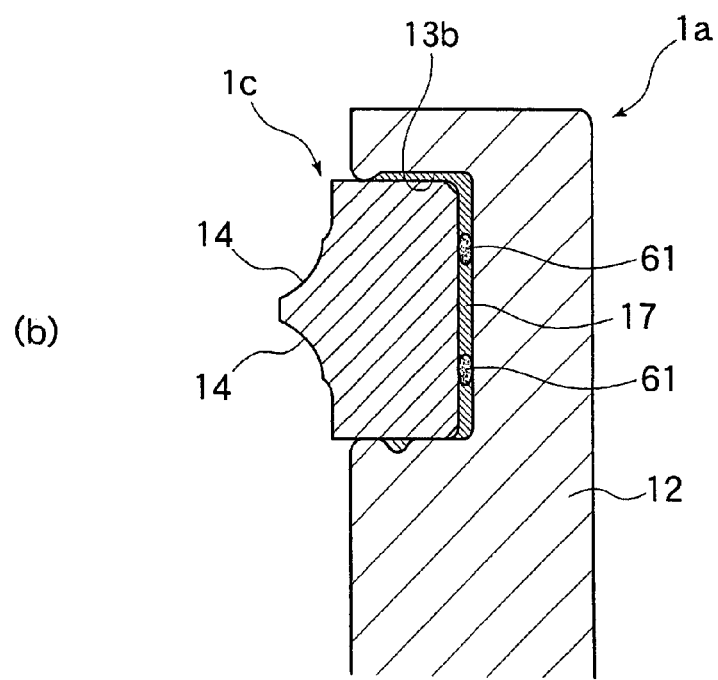

FIG. 10 shows another example in which the rail member 1*c* is fixed in the driven rail mounting groove 13*b* of the rail housing 1*a*. In the example shown in FIG. 10, an elastic member 61 such as a rubber tube, which is sandwiched between the back surface of the rail member 1*c* and the driven rail mounting groove 13*b*, is designed to be compressed when the rail member 1*c* is fitted into the driven rail mounting groove 13*b*. FIG. 10(*a*) as a part of FIG. 10 shows a state in which the rail member 1*c* has not been fitted into the driven rail mounting groove 13*b*, and FIG. 10(*b*) as the other part of FIG. 10 shows a state in which the rail member 1*c* has been positioned and fixed using the rail reference jig 6. When the elastic member 61 is thus interposed between the rail member 1*c* and the driven rail mounting groove 13*b*, the rail member 1*c* receives from the elastic member 61 an urging force acting in such a direction as to press the ball rolling contact surfaces 14 of the rail member 1*c* against the ball projection portions 60 of the rail reference jig 6 respectively in thrusting the rail member 1*c* into the driven rail mounting groove 13*b* using the rail reference jig 6. Therefore, the rail member 1*c* can be positioned more accurately using the rail reference jig 6.

Figure 11:
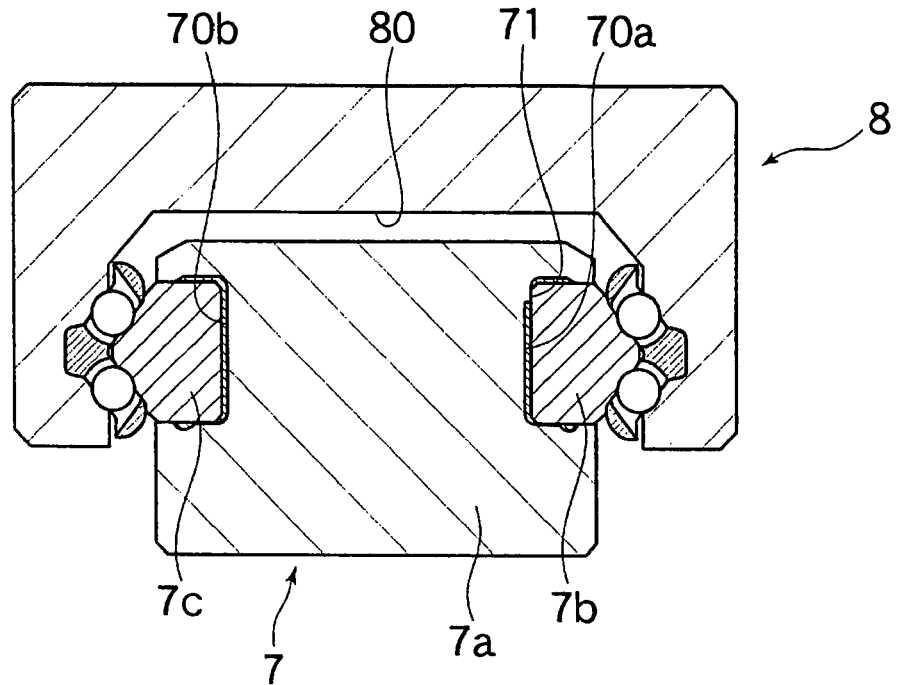
FIG. 11 is a front sectional view showing Embodiment 2 of a linear guide device to which the present invention is applied.

FIG. 11 shows another Embodiment of a linear guide device to which the present invention is applied. In Embodiment 1 of the present invention shown in FIGS. 1 and 2, the track rail 1 is formed substantially in the shape of the channel, and the mobile block 2 is designed to move within the guide groove 10 of the track rail 1. In this Embodiment 2 of the present invention, however, a track rail 7 is formed substantially in the shape of a rectangle in cross-section, and a mobile block 8 is formed substantially in the shape of a saddle while having a guide groove 80 for accommodating an upper half body of the track rail 7.

In this Embodiment 2 of the present invention as well, the track rail 7 is composed of a rail housing 7a and a pair of rail members 7b and 7c, but the rail members 7b and 7c are fixed to outer surfaces of the rail housing 7a, respectively. That is, a pair of rail mounting grooves 70a and 70b, which are oriented away from each other, are formed in the outer surfaces of the rail housing 7a, respectively, and the rail members 7b and 7c are fitted in the rail mounting grooves 70a and 70b, respectively. A reference projection 71 against which a back surface of the rail member 7b is to be abutted is formed on a bottom of the rail mounting groove 70a, and the rail member 7b is engaged with the reference projection 71 to be positioned in the rail mounting groove 70a. That is, the rail mounting groove 70a serves as a reference rail mounting groove.

Figure 12:
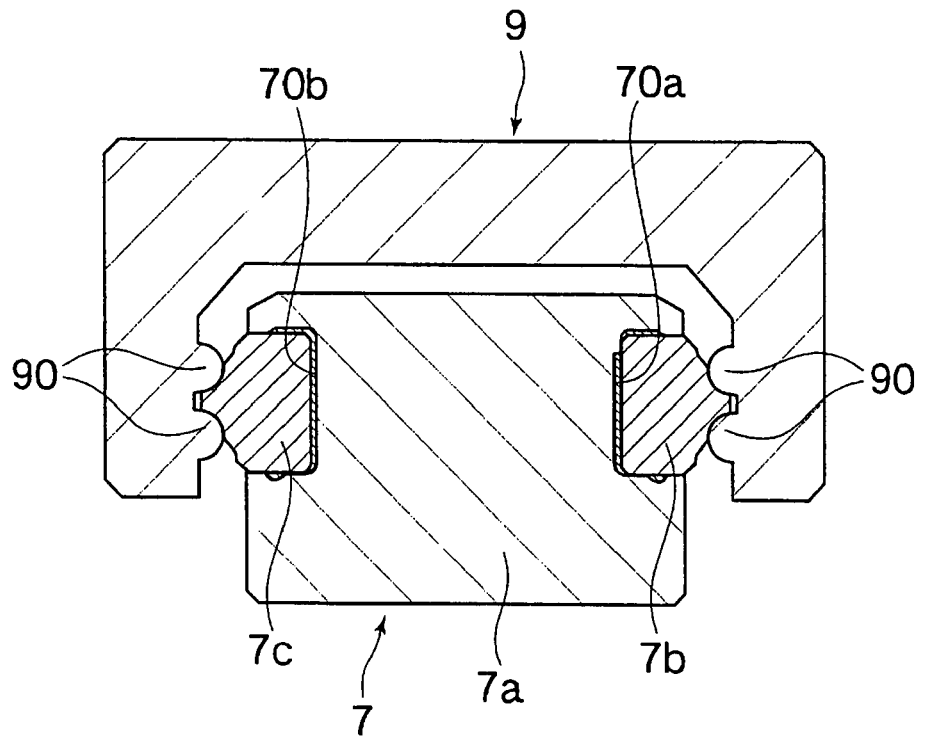
FIG. 12 is a front sectional view showing a rail reference jig used in assembling a track rail according to Embodiment 2 of the present invention.

When the pair of the rail members 7b and 7c are fitted and fixed to the outer surfaces of the rail housing 7a respectively as described above, the present invention can be applied in the same manner as in the aforementioned Embodiment 1 thereof to ensure parallelism between the rail members 7b and 7c. In this case, a rail reference jig 9 as shown in FIG. 12 is used in fitting the rail member 7c into the rail mounting groove 70b as a driven rail mounting groove. The rail reference jig 9, which is formed substantially in the same shape as the mobile block 8, is equipped with ball projection portions 90 for abutting on the ball rolling contact surfaces 14 of the respective rail members 7b and 7c to equalize the clearance between the rail members 7b and 7c with a predetermined distance. The rail members 7b and 7c are fixed using the rail reference jig 9 according to the same method as in the aforementioned Embodiment 1 of the present invention, so no description of the method is given herein.

In the linear guide device illustrated in this Embodiment 2 of the present invention as well, parallelism between the pair of the rail members 7b and 7c can be ensured merely through the fitting of the rail members 7b and 7c into the rail mounting grooves 70a and 70b of the rail housing 7a. As a result, the track rail 7 can be manufactured with ease and at low cost.

The invention claimed is:

1. A linear guide device, comprising:
a track rail having a base portion and a pair of lateral walls to define a guide groove in the track rail, which is faced by inner surfaces of the lateral walls in which rolling contact surfaces for rolling bodies are formed respectively; and
a mobile block fitted within the guide groove of the track rail via the multitude of rolling bodies, characterized in that:
the track rail is composed of a pair of rail members in which the rolling contact surfaces for the rolling bodies are formed respectively, and a rail housing having a pair of rail mounting grooves, in which the rail members are fitted respectively, provided in lateral walls of the rail housing respectively, and the rail members are fixed within the rail mounting grooves via adhesive layers respectively;
the pair of the rail mounting grooves face each other via the mobile block, one of the rail mounting grooves has a reference projection, which is in contact with a corresponding one of the rail members without an intermediary of a corresponding one of the adhesive layers, formed on a bottom of at least the one of the rail mounting grooves in a direction in which the rail mounting grooves face each other, and the rail member fitted in the one of the rail mounting grooves is adhesively fixed in a state of being abutted against the reference projection; and
the rail member fitted in a residual rail mounting groove is adhesively fixed at a predetermined distance from the reference projection.

2. A linear guide device, comprising:
a track rail formed substantially in a shape of a rectangle in cross-section and having rolling contact surfaces for rolling bodies formed in both lateral surfaces of the track rail respectively; and
a mobile block formed in a shape of a saddle with a guide groove, in which the track rail is freely fitted, and combined with the track rail via the multitude of rolling bodies, characterized in that:
the track rail is composed of a pair of rail members in which the rolling contact surfaces for the rolling bodies are formed respectively, and a rail housing having a pair of rail mounting grooves, in which the rail members are fitted respectively, provided in both lateral surfaces of the rail housing respectively, and the rail members are fixed within the mounting grooves via adhesive layers respectively;
the pair of the rail mounting grooves are oriented away from each other, one of the rail mounting grooves has a reference projection, which is in contact with a corresponding one of the rail members without an intermediary of a corresponding one of the adhesive layers, formed on a bottom of at least the one of the rail mounting grooves in a direction in which the rail mounting grooves are oriented away from each other, and the rail member fitted in the one of the rail mounting grooves is adhesively fixed in a state of being abutted against the reference projection; and
the rail member fitted in a residual rail mounting groove is adhesively fixed at a predetermined distance from the reference projection.

3. A linear guide device according to claim 1 or 2, characterized in that the reference projection is formed on the bottom of only one of the rail mounting grooves.

4. A method of manufacturing a track rail of a linear guide device according to claim 3, characterized in that the driven rail mounting groove has provided therein an elastic member for urging the rail member fitted in the driven rail mounting groove toward the rail reference jig.

5. A method of manufacturing a track rail of a linear guide device having a mobile block combined with the track rail via a multitude of rolling bodies, the method characterized by comprising the steps of:
forming a rail housing having a pair of rail mounting grooves at such positions as to face each other, and forming a reference projection on a bottom of one of the rail mounting grooves in a direction in which the rail mounting grooves face each other;
applying adhesive into the rail mounting grooves respectively;
fitting a rail member in which a rolling contact surface for the rolling bodies is formed into a reference rail mounting groove, namely, the one of the rail mounting grooves on which the reference projection is formed, and abutting a back surface of the rail member against the reference projection;
fitting another rail member in which a rolling contact surface for the rolling bodies is formed into a driven rail mounting groove, namely, the other rail mounting groove, and then gradually thrusting a rail reference jig, which engages both the rail members as a pair, from ends of the rail members in a longitudinal direction of the rail members to position the rail member within the driven rail mounting groove; and extracting the rail reference jig from between the pair of the rail members after curing of the adhesive.

* * * * *